(12) United States Patent
Davis et al.

(10) Patent No.: US 9,984,410 B2
(45) Date of Patent: *May 29, 2018

(54) ADAPTIVE DYNAMIC BUDGETING

(71) Applicant: International Business Machines Corporation, Armonk, NY (US)

(72) Inventors: Ryan A. Davis, Raleigh, NC (US); Asima Silva, Holden, MA (US)

(73) Assignee: International Business Machines Corporation, Armonk, NY (US)

(*) Notice: Subject to any disclaimer, the term of this patent is extended or adjusted under 35 U.S.C. 154(b) by 46 days.

This patent is subject to a terminal disclaimer.

(21) Appl. No.: 14/681,502

(22) Filed: Apr. 8, 2015

(65) Prior Publication Data

US 2016/0048912 A1 Feb. 18, 2016

Related U.S. Application Data

(63) Continuation of application No. 14/460,659, filed on Aug. 15, 2014, now Pat. No. 9,830,647.

(51) Int. Cl.
| | |
|---|---|
| *G06Q 20/04* | (2012.01) |
| *G06Q 20/40* | (2012.01) |
| *G06Q 20/10* | (2012.01) |
| *G06Q 40/00* | (2012.01) |
| G06Q 40/02 | (2012.01) |
| G06F 15/02 | (2006.01) |

(52) U.S. Cl.
CPC ............ *G06Q 40/00* (2013.01); *G06Q 40/12* (2013.12)

(58) Field of Classification Search
USPC .............................. 705/26.1, 30, 39; 708/132
See application file for complete search history.

(56) References Cited

U.S. PATENT DOCUMENTS

| | | | |
|---|---|---|---|
| 7,050,997 B1 | 5/2006 | Wood, Jr. | |
| 8,271,344 B1* | 9/2012 | Channakeshava | G06Q 30/00 705/1.1 |
| 2001/0051917 A1 | 12/2001 | Bissonette et al. | |

(Continued)

OTHER PUBLICATIONS

"Make accurate decisions by testing different scenarios", pocketsmith, What-if scenarios, https://www.pocketsmith.com/tour/what_if_scenarios, 2008-2014, 2 pages.

(Continued)

*Primary Examiner* — Hajime Rojas
*Assistant Examiner* — Reva R Danzig
(74) *Attorney, Agent, or Firm* — Farrokh Pourmirzaie; SVL IPlaw Edell, Shapiro & Finnan, LLC

(57) ABSTRACT

According to one embodiment of the present invention, a system for adaptively, dynamically managing a budget adjusts budget categories in response to a potential purchase exceeding the target amount of one budget category and creating an overage. Certain budget categories may have an adjustable target amount while other budget categories may have fixed target amounts and, thus, the budget categories with adjustable target amounts may be adjusted or modified in order to accommodate an overage in another budget category. The budget categories to be modified may be selected based on various priorities and may be suggested to the user for modification upon selection.

11 Claims, 2 Drawing Sheets

(56) References Cited

U.S. PATENT DOCUMENTS

| | | | |
|---|---|---|---|
| 2003/0105711 A1* | 6/2003 | O'Neil | G06Q 20/10 |
| | | | 705/39 |
| 2004/0260633 A1 | 12/2004 | Lee | |
| 2010/0114748 A1 | 5/2010 | Duke et al. | |
| 2011/0106864 A1* | 5/2011 | Neely | G06F 15/025 |
| | | | 708/132 |
| 2013/0030925 A1 | 1/2013 | Calman et al. | |
| 2013/0030994 A1 | 1/2013 | Calman et al. | |
| 2016/0048928 A1 | 2/2016 | Davis et al. | |

OTHER PUBLICATIONS

List of IBM Patents or Patent Applications Treated as Related, Apr. 8, 2015.

* cited by examiner

ADAPTIVE DYNAMIC BUDGETING

CROSS-REFERENCE TO RELATED APPLICATIONS

This application is a continuation of U.S. patent application Ser. No. 14/460,659, entitled "ADAPTIVE DYNAMIC BUDGETING" and filed Aug. 15, 2014, the disclosure of which is incorporated herein by reference in its entirety.

BACKGROUND

Present invention embodiments relate to computerized budgeting systems and more specifically, to a computer program product, method and system for budgeting which dynamically adjusts budgets and budget categories in accordance with at least user inputs, preferences, and trends.

Many people use some sort of application or method to manage and keep track of their expenses, purchases, debt, and other monetary transactions. Some people also use a budget to allot certain amounts of money for various areas. However, sometimes unexpected expenses may arise which may prevent a person from staying within their budget. Similarly, life events, emergencies, and other such matters may alter how a person spends his or her money. Unfortunately, budget applications or systems are generally not flexible to accommodate for unexpected expenses or events that cause financial alterations.

SUMMARY

According to one embodiment of the present invention, a system for adaptive dynamic budgeting is disclosed. The system includes at least one processor and is configured to manage a budget that includes a plurality of budget categories. Each budget category has an associated target amount for expenses and at least one budget category of the budget is associated with an adjustable target amount while the remaining budget categories of the budget are associated with fixed target amounts. The system is configured to determine an overage for a budget category of a budget relative to an associated target amount for expenses pertaining to that budget category and then identify one or more other budget categories associated with adjustable target amounts and including total expenses less than the associated target amounts. After identifying a budget category, the system may be configured to modify the adjustable target amounts of one or more of the identified other budget categories to compensate for the overage.

Embodiments of the present invention further include a method and computer program product for adaptive dynamic budgeting in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments relate to a method, system and computer program product for adaptive dynamic budgeting. For example, in one embodiment, a system for managing a budget determines when a potential purchase may exceed a target amount for a budget category included in the budget (e.g. create an overage) and modifies other budget categories in order to accommodate the potential purchase.

Figure 1:
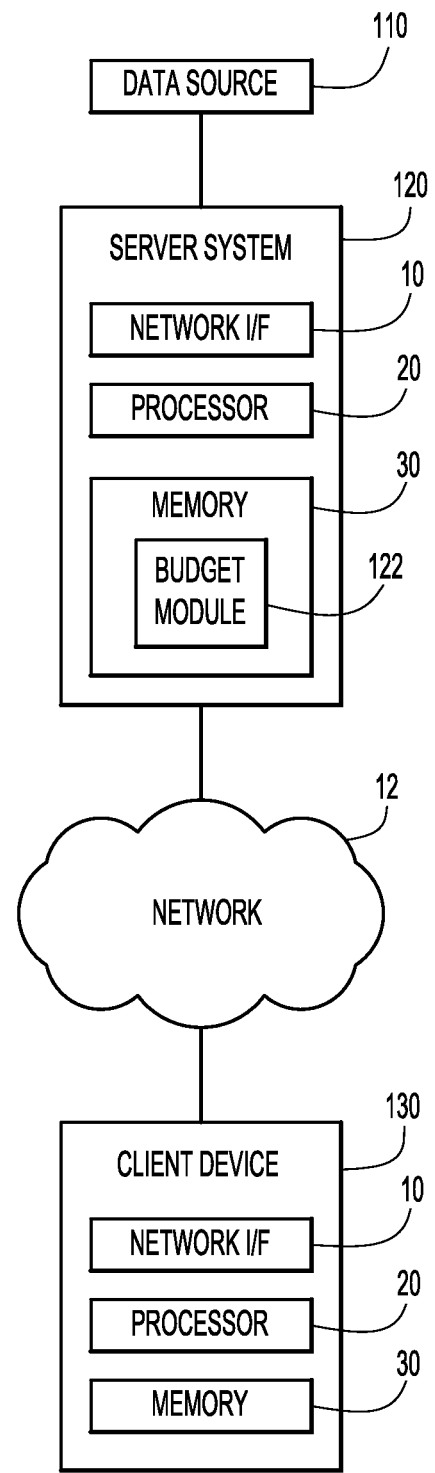
FIG. 1 is a diagrammatic illustration of an example environment for an embodiment of the present invention.

An example environment for present invention embodiments is illustrated in FIG. 1. Specifically, the environment includes one or more data sources 110, one or more server systems 120, and one or more client or end-user systems 130. Data sources 110, server systems 120, and client systems 130 may be remote from each other and communicate over a network 12. Network 12 may be implemented by any number of any suitable communications media (e.g., wide area network (WAN), local area network (LAN), Internet, intranet, etc.). Alternatively, any number of data sources 110, server systems 120, and/or client systems 130 may be local to each other, and communicate via any appropriate local communication medium (e.g., local area network (LAN), hardwire, wireless link, intranet, etc.). A data source 110 may be implemented by any conventional information storage system (e.g., database, file system server, etc.).

A server system 120 may include a budget module 122. The budget module 122 may be implemented across plural server systems. Alternatively, the budget module 122 may reside on a client system 130 for a stand-alone mode of operation or other computer system in communication with the client system. Client systems 130 enable users to communicate with the budget module 122 (e.g., via network 12). The client systems may present any graphical user interface (e.g., GUI, etc.) or other interface (e.g., command line prompts, menu screens, etc.) to receive commands from users and interact with the budget module 122 and/or other modules or services.

Server systems 120 and client systems 130 may be implemented by any conventional or other computer systems preferably equipped with a display or monitor, a base (e.g., including at least one processor 20, memories 30 and/or internal or external network interface or communications devices 10 (e.g., modem, network cards, etc.)), optional input devices (e.g., a keyboard, mouse, or other input device), and any commercially available, and custom software (e.g., index software, database software, etc.)).

The budget module 122 may include one or more modules or units to perform the various functions of present invention embodiments described below. The various modules (e.g. budget module 122) may be implemented by any combination of any quantity of software and/or hardware modules or units, and/or may reside within memory 30 of a server system and/or client systems for execution by processor 20.

Figure 2:
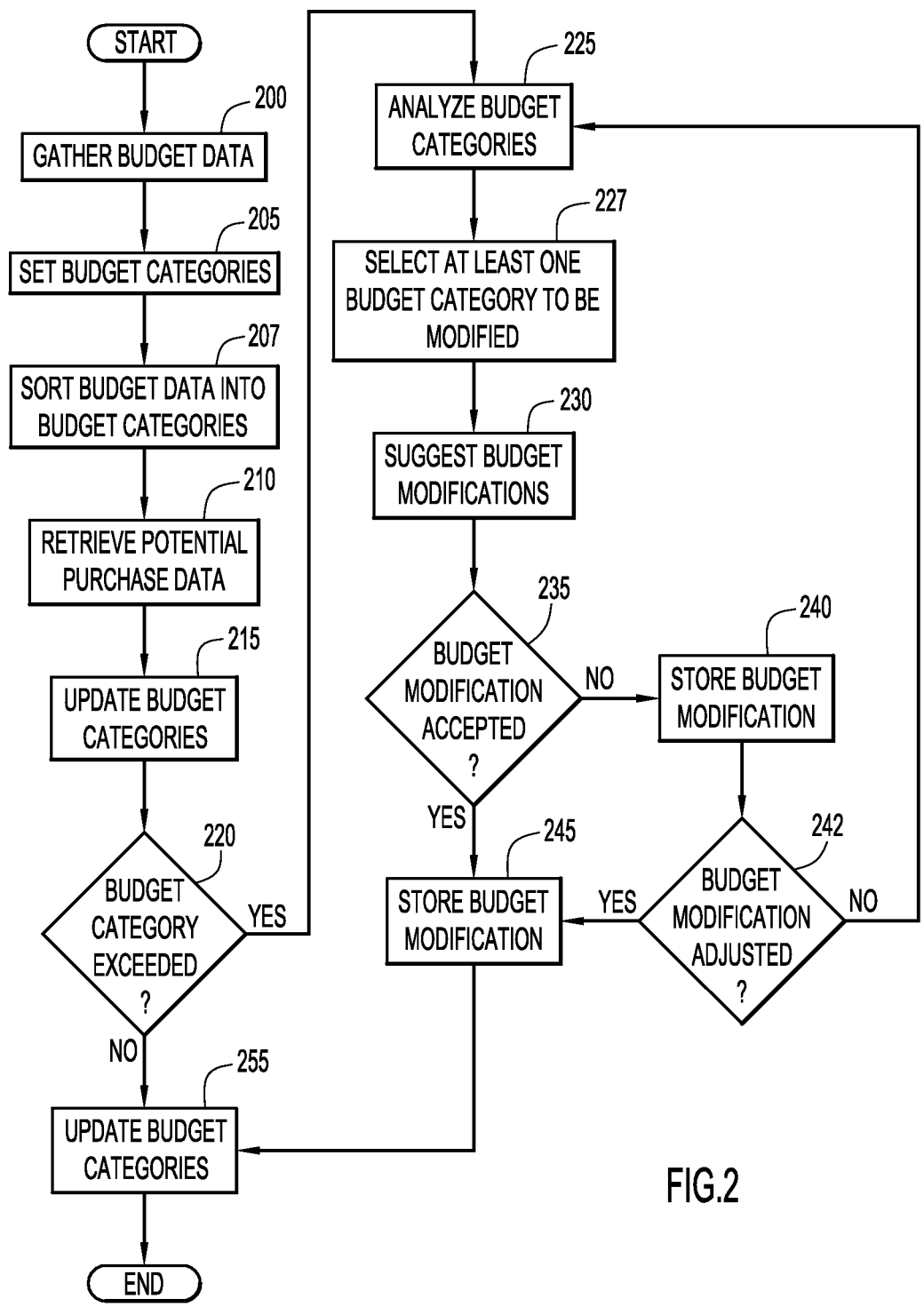
FIG. 2 is a flow diagram illustrating an example manner of adaptive dynamic budgeting according to an embodiment of the present invention.

A manner of adaptive, dynamic budgeting (e.g. via budget module 122 and server system 120 and/or client system 130) is illustrated in FIG. 2. Generally, adaptive, dynamic budgeting allows for continuous modifications of budget categories in response to user trends, data, priorities, etc. in order to accommodate purchases that might exceed a target amount (e.g. a spending limit or budget) of a certain budget category and create an overage. In other words, adaptive, dynamic budgeting may generate budget modifications that increase or decrease the target amounts of certain budget categories over a specified time interval in order to allow for fluctuations in the target amounts of other budget categories while maintaining an overall budget or overall target amount for expenses. When at least one budget category is modified, the specific budget modification applied, as well as information associated with the situation which caused the budget modification (e.g., the time of month or type of purchase which caused the modification to be generated) may be stored to allow future budget modifications to adapt to user preferences, trends, or habits. Consequently, the suggested budget modifications may improve over time as the budget modifications adapt to user preferences, trends, and habits.

As a general example of adaptive, dynamic budgeting, if a user is going to a wedding and would like to give a wedding gift of $150 when only $100 of cash is available in their budget, the user may enter the $150 cash gift as a potential purchase. Then, if money is left in their entertainment and restaurant budget categories and these budget categories are prioritized for modification, as described below in detail, these budget categories may be selected for modification. Consequently, modifications to these categories may be suggested to the user, such as reducing the entertainment budget by $20 and reducing the restaurant budget by $30 to free up an additional $50 for the cash gift. If the user selects this modification, the user may then realize they need to skip dinner and a movie with their friends that Friday night in order to accommodate the $150 wedding gift in their budget.

More specifically, and now referring to FIG. 2, initially, budget data is gathered at step 200 to determine a user's budgets, past purchases, pending purchases, etc. In some embodiments, the budget module 122 may be configured to access financial systems and/or servers and gather purchase history and/or past transactions from these systems and servers. Additionally or alternatively, budget data may be manually entered or input, if desired. For example, in some embodiments, financial servers may be accessed to gather any transactions performed on a first credit card (e.g. a personal credit card) while transactions conducted with a second credit card (e.g. select transactions conducted on a business credit card) may be manually input via any desirable user interface. However, in other embodiments, the budget data may be gathered via any desirable manners, such as by scanning barcodes included on products, receipts, etc.

In some embodiments, the budget data gathered at step 200 may also reveal a user's spending habits, trends, etc. For example, in some embodiments, the budget data may include information about the merchant, payee, payor, time and date of the purchase, and other such identifying information that may allow the budget data to be sorted, classified, or otherwise organized. For example, certain transactions within the budget data may be classified as entertainment, sports, fast food, groceries, restaurants, etc. The transactions may also be sorted by date, time, etc. or any other information that can be gleaned form the budget data. In the embodiments where the budget data reveals a user's spending habits, trends, etc., budget categories with target spending amounts may be created automatically, at step 205, based on the user's trends and habits. For example, if a user has spent an average of $250 on groceries over the past five months, a budget category for groceries with a target spending amount of $250 may created automatically at step 205. Alternatively or additionally, a user may manually input or create any desired budget categories and may set target amounts, limits, minimums, or budgets for each of these budget categories.

Additionally, when the budget categories are set up, various attributes may be assigned or designated to any of the budget categories. For example, in some embodiments, certain budget categories may be designated as either mutable or immutable. If a budget category is designated to be a mutable, this designation may indicate that the budget category is flexible, fluctuating, or otherwise malleable. Such a designation may be assigned to categories with wide variations in spending per month, high numbers of purchases, or any other desirable item or indicator which tends to show flexibility. For example, if a user spent $300 on clothing in January, spent $0 on clothing in February, spent $1500 on clothing in March, and was credited $1000 for clothing in April (perhaps from a return), a budget category for clothing may be designated as a mutable category. Alternatively, a mutable designation may be assigned to a certain budget category. Regardless, a mutable budget category may have an adjustable target spending amount.

In contrast, if a budget category includes only a few transactions each month, nearly identical spending amounts each month, or other items or indicators which tend to show constant, non-fluctuating expenses, this budget category may be considered immutable. For example, if a user makes a rent payment to the same payee on the same day of the month, every month, for nearly identical amounts and/or this is the only transaction included in a certain budget this budget category may be considered immutable. Common examples of immutable budget categories may include housing, utility, insurance, and membership fees (e.g. professional, gym, or other such memberships). In other words, immutable budget categories may have fixed target spending amounts.

Regardless of if a budget category is deemed mutable or immutable, the target amount (e.g. the expected spending amount) associated with a budget category may also vary based on specified times. In other words, the value of a target amount for a budget amount may fluctuate between different values during certain time periods. For example, an immutable budget category for electricity bills may have a fixed target spending amount, but the fixed target amount may have a first value for summer months and a second, lower value during winter months, when less air conditioning is used and, thus, less electricity is used. Similarly, the target amount for a mutable budget category for shopping may increase in November and December in order to accommodate holiday expenses. In some embodiments, the values of target amounts may be designated to fluctuate (e.g. a user may input monthly target amounts, designate certain months for increases, etc.), but in other embodiments, the target amounts may automatically fluctuate in accordance with known tendencies or habits.

In some embodiments, at least one budget category may be designated or determined to be a mutable budget category and the remainder of the budget categories may be immutable. If a budget category is designated as immutable (either automatically or by the user), this category may be avoided when budget modifications are suggested or implemented. In contrast, the mutable budget categories may be suggested for modification or modified first if a budget modification is necessary, as is described below in detail. Additionally or alternatively, the budget categories may also be assigned priority ranks, such as high, medium, and low or be prioritized from 1 to n, where n is an integer larger than 1. When the budget categories are prioritized, the budget categories with the lowest priority (e.g. lowest or highest number or ranked as "low") may be modified first when a budget modification is required. In some embodiments, each of the mutable categories may initially be ranked as a "low priority" budget category and, then, each of the low priority budget categories may be subsequently sorted into a numbered priority list as a user's preferences are learned, perhaps through the selection of budget modifications. However, in other embodiments, only the mutable categories are ranked or prioritized, so that the immutable budget categories are never altered. In still other embodiments, both the immutable and mutable categories may be prioritized, if desired. In such embodiments, the prioritization of the immutable categories may indicate, among other items, the order that a user may desire to pay their bills in (e.g. electricity may be prioritized over cell phone).

Once the budget categories are set at step 205, any transactions from the budget data may be sorted into the appropriate budget categories at step 207. If the budget data includes information relating to the type of purchase, the budget data may be automatically sorted into an appropriate budget category. However, in some embodiments, a user may be required to manually sort, categorize, or recategorize (e.g. to correct an automatic categorization) the budget data into the appropriate budget category. When the budget data is sorted into budget categories, the total amount of expenses spent in each budget category may be determined and compared to the target amount for its respective budget category. Additionally, a user's spending habits, trends, such as the average number of transactions conducted in certain categories over a certain time period, may be learned by sorting or categorizing the budget data at step 207.

In some embodiments, different categories may also be created for different users included in an overall budget. For example, in some embodiments, an overall budget may include budget data from a number of associated or related users, such as a family, and the budget data may be sorted by user (e.g. user-based sorting). For example, if the overall budget is for a family, in some embodiments the data may be sorted into parental transactions and child transactions, but in other embodiments the data may be sorted by unique user (e.g. mother, father, child 1, and child 2, instead of parents and children) or any other desirable categories. In some embodiments, specific financial accounts or cards may be associated with a specific user in order to facilitate user-based sorting, but in other embodiments, the budget data may be associated with a specific user in any desirable method or manner. As another example, in some embodiments, a user may indicate that a certain type of transaction (perhaps purchasing lunch at school) is only associated with a unique user and this association may be stored in memory in order to associate all such purchases with that user in the future.

In embodiments which include more than one user, specific budget categories or portions thereof may be associated with a user. In some embodiments, each budget category may include sub-categories for each user. Thus, a primary user (e.g. the head of the household) may be able to view the spending habits of each specific user, instead of or in addition to viewing the overall budget status. Additionally or alternatively, a secondary user (e.g. not the head of the household) may be given certain access rights such that the secondary user may only view or access certain budget categories or sub categories. For example, if a father sets up budgets for groceries, restaurants, entertainment and housing costs, the father may access budget data for any of these budget categories, but may set up budget sub categories for entertainment and restaurants for his son, and may restrict access to the housing costs budget data. Consequently, in this example, the son may only view his specific sub budgets for entertainment and restaurants, while the father may monitor overall expenses, his son's spending and his own spending.

Once the aforementioned steps have been taken, a user may be able to view their budget categories, budget data and the status of each budget category. Accordingly, a user may be able to determine that a potential future purchase may cause them to exceed the target amount for a certain budget category, thereby creating an overage. However, instead of simply refraining from making this purchase, a user may wish to see how making this potential purchase may impact other budget categories, future budget categories, credit or some combination thereof. Alternatively or additionally, a user may be unaware of the status of their budget categories and may want to determine whether a purchase would fit within their budget categories. Regardless of the reason, at step 210 a user may enter potential purchase data (e.g. price and budget category).

Once the potential purchase data has been received at step 210, the budget categories impacted by the potential purchase data may be updated at step 215. If the updated budget category does not exceed the target amount (e.g. does not create an overage), as determined at step 220, the user may be notified that the potential purchase does not require any budget modifications and the budget categories may by be updated to include the potential purchase data at step 255. Alternatively, if the updated budget category includes an overage in a budget category due to the inclusion of the potential purchase, the budget categories may be analyzed, at step 225, in order to select a budget category to be modified at step 227, so that budget modifications may be suggested at step 230.

When analyzing the budget categories at step 225, a number of factors, including the status of a budget category, the time of the month, the characteristics of the budget data, and spending habits and/or trends of a user, may be considered. In some embodiments, each mutable budget category may be analyzed to determine a ratio comparing the percentage of a budget remaining (e.g. target amount minus total expenses, per budget category) to the amount of time left in the time interval the budget is associated with (e.g. the days left in the month). This ratio may reveal the amount of dollars per day available to a user in each budget category for the remainder of the budget time period. As an example, if a user has a budget with mutable budget categories for clothing, entertainment, and groceries with target spending amounts of $150/month, $100/month, and $250/month, respectively, and the user has spent $140 on clothing, $100 on entertainment, and $150 on groceries by the twentieth day of a thirty day month, the grocery budget category may have a $10/day ratio while the clothing and entertainment budget categories have $1/day and $0/day ratios, respectively.

If this ratio is compared to past spending habits, each budget category may be analyzed to determine if the user is likely to be under or over the target budget amount for each budget category for the remainder of the month. In other words, analyzing the dollar-per-day ratio together with past spending habits, may reveal whether a certain budget category is "healthy" or "unhealthy," insofar as healthy implies that total expenses for a certain budget category are likely to be less than the target amount of that budget category for that month while unhealthy implies that total expenses for a certain budget category are likely to be more than the target amount of that budget category for that month. In some embodiments, healthy budget categories may be preferable to unhealthy budget categories for modification and, thus, may be given a lower priority. However, in some embodiments, a definitive categorization of a category may not be able to be determined and a budget category may be considered deemed tentatively healthy or unhealthy, or some degree thereof. In some embodiments, if a non-definitive categorization (e.g. a budget category is tentatively unhealthy, but not quite unhealthy), the priority of this budget category may remain unchanged. In other embodiments, a tentative categorization may allow for minor or small priority modifications.

Building on the dollar-to-day ratio example provided above, if a user had previously spent an average of $100 on groceries in the last ten days of a month, the grocery category may be deemed healthy since $100 remains available with ten days left in the month. By comparison, if a user had spent varying amounts on clothing and entertainment in the last ten days of previous months, such as ranging from $0 to $250, the entertainment and clothing categories may be deemed tentatively unhealthy, or some degree thereof, in some embodiments. However, in other embodiments, the clothing category could be deemed tentatively healthy, despite only having a $1/day available and could be moved to a higher priority (e.g. less likely to be selected for modification) if another budget category that was previously higher is healthy or extremely healthy (e.g. the budget category has more than enough allotted to cover predicted remaining expenses). By comparison, the entertainment category ($0 remaining) may be deemed unhealthy since it has $0 remaining and, thus, may be moved to the highest priority for mutable budget categories (e.g. least likely mutable category to be selected for budget modification).

Despite the above, in some embodiments, the budget categories may be simply be ranked or organized in order of highest dollar-to-day ratio to lowest, such that the category with the highest dollar-to-day ratio is given the lowest priority so that it may be suggested for modification first. In other embodiments, a ratio may or may not be determined when the budget categories are analyzed at step 225 and may or may not be used or considered in any desirable manner. In still other embodiments, a user may set an ultimate priority list, freeze the priority of at least one budget group, or otherwise fix the priorities of at least one budget category, as desired. In these embodiments, the original priority list may override any analysis which tends to show the health of a category.

Additionally, in some embodiments, multiple budget categories may be analyzed together and/or sequentially, in order to determine if multiple budget categories could be selected for modification in order to reduce the possibility of future budget modifications being required. Again turning to the dollar-to-day ratio example provided above, if the clothing budget is determined to be tentatively healthy, this budget could be analyzed in conjunction with the grocery budget in order to determine if slight modifications to both budgets would result in both budget categories remaining healthy while allowing the flexibility required for the potential purchase. Accordingly, in some embodiments, multiple budget categories may be given identical priority if it is determined that modification to multiple budget categories would be beneficial. In other words, the overarching goal of the analysis performed at step 225 is to balance the overall budget over the entire time interval the budget is intended for and, thus, to balance each of the individual budget categories. Thus, regardless of how the analysis is performed at step 225, the analysis may enable at least one budget category to be selected for modification at step 227.

In order to select at least one priority budget category at step 227, the budget categories may be ranked, sorted, or otherwise prioritized in accordance with user preferences, spending trends, and/or any information gleaned or learned from analysis of the budget categories at step 225 and, then, at least one of the lower priority budget categories may be selected for modification. As briefly mentioned above, initially, a priority ranking is either determined automatically or set by a user. However, depending on the analysis of the budget categories performed at step 225, an initial priority list or ranking may be modified in order to determine at least one budget category to be modified at step 227. For example, in some embodiments, a priority budget category may be determined, at step 225, based on the time of month, amount of expenses left in a certain budget category, the priority listing or rankings discussed above, or some combination thereof.

Preferably, a user may initially rank or order the budget categories in an order that the user believes would be best for modification. In some embodiments, only the mutable budget categories may be ranked or ordered by the user. In other embodiments, if a user does not rank or order the budget categories, an order or rank may be assigned to each of the budget categories based on prior spending habits and trends. In some embodiments, if certain budget categories have been deemed immutable, these budget categories may be excluded from the priority list, but in other embodiments the immutable budget categories may be given a high priority ranking, insofar as high priority means that these budget categories may be selected or suggested for modification subsequent to low priority categories. However, as mentioned, the priority of these categories may be altered depending on the analysis performed at step 225.

For example, in the example given above with respect to a user with a budget with mutable budget categories for clothing, entertainment, and groceries with target spending amounts of $150/month, $100/month, and $250/month, the user may initially assign rank the mutable budget categories as follows: (1) clothing; (2) entertainment; (3) groceries. However, since the user has $1/day left for clothing, $0/day left for entertainment, and $10/day left for groceries, the budget priority list may be reordered to move groceries ahead of at least entertainment. In other embodiments, the grocery budget category may simply receive a tick mark for satisfying a certain criteria and upon receiving a certain number of tick marks, a budget category's priority may be shifted or altered. Regardless, if a budget modification is required, a modification to the lowest priority budget category may be suggested. Thus, in this example, a modification to the grocery budget may be suggested prior to a modification to the entertainment. Among other benefits, this alteration of the priority list may reduce the number of budget modifications required to balance a budget (e.g. a second modification would not be required to adjust for a modification to entertainment that caused overspending in entertainment).

In some embodiments, the priority list of budget categories may be reordered when a certain criteria is met. For example, if the dollar-to-slay ratio mentioned above hits a certain threshold, a certain budget category may automatically move or be moved in the priority list. However, in other embodiments, a modification to a first budget category may automatically cause a specific second budget category to be selected for modification. Such a correlation may be learned over time or input by a user, if desired. As an example, if a user wants their restaurant budget to be reduced every time they overspend their grocery budget, a user may input this correlation or rule. Alternatively or additionally, if a user elects to modify (e.g. reduce) their restaurant budget every time the target amount for their grocery budget is exceeded, this modification may become associated with exceeding the target amount for the restaurant budget and automatically selected for modification at step 227.

In still other embodiments, modifications to a user's budget categories for a certain month may not be possible or desirable for the current time period. Accordingly, in some embodiments, future budget categories may be selected for modification. In such embodiments, future budget categories may still be selected in accordance with a current priority list. Alternatively or additionally, if a user does not have enough savings or funds to cover a potential purchase that exceeds the target amount for a certain budget category, the true price of the purchase may be shown and future budget modifications may be suggested accordingly. In these embodiments, credit information, including a time interval, interest rate, and proposed payment plan, pertaining to making the potential purchase using credit may be obtained in order to determine the actual cost or true price of a potential purchase.

For example, if a user wants to purchase a $250 tech product and the budgets for the current month cannot or should not (perhaps in view of expected future purchases this month) be modified to accommodate such a purchase, as determined via analysis of the budget categories at step 225, budget categories from future time periods (e.g. next month or the next three months) could be selected at step 227 for modification. If the user has enough funds to pay off the purchase now (e.g. the user can dip into savings to pay off a credit card bill), future budget categories may simply be selected for reduction to balance the total budget over the total time interval (e.g. a monthly budget may be averaged over three months). However, if the user does not have enough money on hand, future budget categories may be selected and may be reduced (e.g. in order to balance the overall 3-month budget) and modified to include interest payments required to pay off the debt incurred to make the purchase. Thus, a user may be able to determine how much of a credit card bill to pay above the minimum and the actual cost of the purchase may be shown via inclusion of the interest payments in the specific budget category.

After at least one budget category has been selected for modification at step 227, budget modifications may be suggested to the user at step 230. In preferred embodiments, as many as three budget modifications may be suggested to a user, however, in other embodiments, as many modifications as desired may be suggested to a user. In some embodiments, each budget modification suggested may be based on a different method or analysis. For example, in some embodiments, a first budget modification may be suggested to a user based on an input priority list modified in view of a calculated dollar-to-day ratio, a second modification may be suggested based on an analysis of which modification is believed to minimize the total number of modifications required to balance the budget if the potential purchase is made, and a third budget modification may be suggested to the user based on past budget modifications made when similar potential purchase data was received.

Once budget modifications are suggested to a user at step 230, a user may either accept or decline the budget modifications at step 235. If the user accepts the budget modifications at step 235, the suggested budget modification information may be stored at step 245 (e.g. what modification was suggested, the current budget category status, and pending potential purchase data), and the budget categories may be updated, at step 255, to reflect the selected budget modification. In contrast, if the user declines the suggested budget modifications at step 235, the suggested budget modification information (e.g. data showing the user declined the suggested budget modifications in view of the current budget category status and pending potential purchase data) may be stored at step 240. Thus, upon re-analyzing the budget categories, the same budget modification suggestions may not be explored. However, prior to re-analyzing the budget data, at step 225, the user may be afforded an opportunity to modify the budget modifications at step 242. Thus, if the suggested modifications are close to a user's preferences, the modifications may be slightly adjusted to perfectly align with a user's preferences at step 242. If a modification is made at step 242, the suggested budget modification information may be stored at step 245 and the budget categories may be updated, at step 255, to reflect the modified budget modification. If not, the budget categories may be re-analyzed at step 225 so that new budget categories may be selected and suggested to the user for modification at steps 227 and 230, respectively.

Since suggested budget modification data is stored regardless of whether a budget modification is accepted, user preferences for certain modifications in certain situations (e.g. when certain budget category conditions are present or certain potential purchase data is received) can be learned and adapted to. Additionally, storing user modifications may allow user preferences to be learned and adapted to over time. In light of this, the number of declined budget modification suggestions may be minimized over time, as a user's preferences, trends, etc. are learned and incorporated into the analysis performed at step 225.

Additionally, since the circumstances associated with a certain budget modification suggestion are stored, these circumstances may be considered in future analysis to create alerts for a user moving forward. For example, if a certain purchase caused overspending in at least one budget category and this overage required drastic modifications, a warning or alert may be issued if similar overspending begins to happen or is considered by the user again. A warning or alert may also be issued when a modification is about to be made in order to ensure that a user understands the full implications of a modification and understands the possible upcoming expenses in a certain budget category. Similarly, a warning may be issued if current spending habits would result in an overage if continued for the remainder of the budget's time interval. Moreover, if a child account or sub account overspends or begins to overspend, an alert may be issued to a parent to warn of possible overspending.

In some embodiments, the budget module may also be synchronized with a user's calendar, email, or other such personal accounts. In such embodiments, certain events may be associated with costs and budget categories in order to further adapt a budget to a user's trends and habits. For example, if a transaction at a restaurant has a timestamp for noon and a user's calendar has a lunch scheduled on that same day, the event "lunch" may become associated with the cost of that transaction. Accordingly, when the budget categories are analyzed at step 225, future events may be taken into account in order to more accurately reflect the status of a certain budget category (e.g. whether a budget category is healthy). Additionally, certain costs may begin to be associated with birthdays, weddings, and other such events, such that these events may be incorporated into a budget. Generally, the costs of any event labeled "lunch" may be averaged to determine the cost of a lunch, the costs of any event labeled "wedding" may be averaged to determine the cost of a wedding, etc., however, in other embodiments, the costs of events may be calculated in any desirable manner. For example, in some embodiments, travel websites or servers may be accessed to determine an estimated cost of a wedding based on its location.

It will be appreciated that the embodiments described above and illustrated in the drawings represent only a few of the many ways of implementing embodiments for a system, method, and computer program product of adaptive dynamic budgeting.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The sources may be included within or coupled to the server and/or client systems. The sources and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., tabs, etc.) to navigate between the screens in any fashion.

The present invention embodiments are not limited to the specific tasks or algorithms described above, and may also be utilized for a system, method, and computer program product for accounting, savings, expense management, etc., as desired.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of managing a budget comprising:

determining an overage for a first budget category of the budget relative to an associated target amount for expenses;

determining that the first budget category is associated with a mutable target amount based on variations included in prior data determined to be associated with the first budget category;

determining that a second budget category of the budget is associated with an immutable target amount based on patterns included in prior data determined to be associated with the second budget category;

identifying one or more other budget categories associated with mutable target amounts, and including total expenses less than target amounts associated with the one or more other budget categories;

displaying, on a user interface of a computing device, candidate modifications to the mutable target amounts of at least one of the one or more identified other budget categories to compensate for the overage and balance the budget;

receiving a selection of one of the candidate modifications;

storing the selection with current budget conditions and learning user preferences over time; and subsequent to storing the selection, automatically implementing a learned budget modification when associated budget conditions are detected so that multiple candidate modifications are not generated when the associated budget conditions are detected subsequent to storing the selection, thereby reducing the number of processing operations and user interactions required to balance the budget subsequent to storing the selection.

2. The computer-implemented method of claim 1, wherein target amounts for the budget categories are for expenses over a specified time interval.

3. The computer-implemented method of claim 1, wherein each budget category of the budget associated with a mutable target amount includes a priority, and modifying the mutable target amounts further includes:

modifying the mutable target amounts of one or more of the identified other budget categories based on the priorities to compensate for the overage.

4. The computer-implemented method of claim 1, wherein values for the target amounts vary based upon specified times.

5. The computer-implemented method of claim 1, wherein modifying the mutable target amounts further includes:

presenting the identified one or more other budget categories for selection; and modifying the mutable target amounts of the selected budget categories to compensate for the overage.

6. The computer-implemented method of claim 1, wherein determining an overage further includes:

determining the overage based on a potential purchase;

wherein modifying the mutable target amounts further includes:

receiving credit information pertaining to making the potential purchase using credit, wherein the credit information includes a time interval, proposed payments, and an interest rate;

determining an actual cost of the potential purchase based on the credit information; and modifying the mutable target amounts of one or more of the budget categories of the budget to account for the proposed payments.

7. The computer-implemented method of claim 1, further including:

determining a projected expense total for a budget category of the budget based on one or more prior expenses for that budget category; and generating an alert in response to the projected expense total exceeding the associated target amount for that budget category.

8. The computer-implemented method of claim 1, wherein the budget conditions include events determined from at least one of an email account or a calendar account.

9. The computer-implemented method of claim 1, further comprising:

assigning priority ranks to the other budget categories; and determining the candidate modifications based on the priority ranks.

10. The computer-implemented method of claim 1, wherein learning user preferences over time further comprises:

storing a history of selected candidate modifications, unselected candidate modifications and corresponding budget conditions to learn user preferences over time;

analyzing the history for a particular user; and deriving candidate modifications specific to the particular user under various budget conditions based on the analyzing.

11. The computer-implemented method of claim 10, further comprising:

continually updating the user preferences by analyzing a set of selections received over time to update the learned candidate modification.

* * * * *